(12) United States Patent
Yang

(10) Patent No.: US 12,591,422 B2
(45) Date of Patent: Mar. 31, 2026

(54) AUTOMOTIVE OTA UPDATE CONTROL DEVICE AND METHOD THEREFOR

(71) Applicants: HYUNDAI MOTOR COMPANY, Seoul (KR); KIA CORPORATION, Seoul (KR)

(72) Inventor: Jeong Seog Yang, Hanam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 178 days.

(21) Appl. No.: 18/217,658

(22) Filed: Jul. 3, 2023

(65) Prior Publication Data

US 2025/0013450 A1 Jan. 9, 2025

(30) Foreign Application Priority Data

Mar. 9, 2023 (KR) ........................ 10-2023-0031190

(51) Int. Cl.
*G06F 8/65* (2018.01)
*H04W 4/46* (2018.01)
(52) U.S. Cl.
CPC ................ *G06F 8/65* (2013.01); *H04W 4/46* (2018.02)
(58) Field of Classification Search
CPC ........................................................ G06F 8/65

USPC ........................................................ 717/172
See application file for complete search history.

(56) References Cited

U.S. PATENT DOCUMENTS

| | | | | |
|---|---|---|---|---|
| 9,464,905 B2* | 10/2016 | Lewis | ............... | H04W 12/0471 |
| 2015/0220321 A1* | 8/2015 | Jung | ........................ | H04L 67/12 |
| | | | | 717/169 |
| 2016/0189544 A1* | 6/2016 | Ricci | ................ | G08G 1/096725 |
| | | | | 701/117 |
| 2021/0224056 A1* | 7/2021 | John | ........................ | H04W 4/46 |
| 2024/0192945 A1* | 6/2024 | Choi | ........................ | H04L 67/34 |
| 2025/0208858 A1* | 6/2025 | McFarland, Jr. | ......... | G06F 8/71 |

* cited by examiner

*Primary Examiner* — Evral E Bodden
(74) *Attorney, Agent, or Firm* — Lempia Summerfield Katz LLC

(57) ABSTRACT

An automotive over-the-air (OTA) update control device includes a first communication device that provides a communication interface with a data server and a second communication device that provides a communication interface between vehicles. The automotive OTA update control device also includes a controller that requests cluster update from the data server and allows the first communication device and the second communication device to transmit received update data to a vehicle located nearby while receiving a plurality of pieces of update data for a first Electronic Control Unit (ECU) from the data server and to receive a plurality of pieces of update data for a second ECU from the vehicle located nearby.

14 Claims, 5 Drawing Sheets

AUTOMOTIVE OTA UPDATE CONTROL DEVICE AND METHOD THEREFOR

CROSS-REFERENCE TO RELATED APPLICATION

This application claims the benefit of and priority to Korean Patent Application No. 10-2023-0031190, filed in the Korean Intellectual Property Office on Mar. 9, 2023, the entire contents of which are incorporated herein by reference.

TECHNICAL FIELD

The present disclosure relates to a technology for controlling over-the-air (OTA) updates of Electronic Control Units (ECUs) provided in a vehicle.

BACKGROUND

Automotive parts have rapidly developed into automotive electronics, which leads to a significant increase in the type and number of electronics in vehicles. The electronic devices may be largely used in a power train control system, a body control system, a chassis control system, a vehicle network, a multimedia system, or the like. The power train control system may include an engine control system, an automatic shift control system, or the like. The body control system may include a body electric parts control system, a convenience device control system, a lamp control system, or the like. The chassis control system may include a steering control system, a brake control system, a suspension control system, or the like. The vehicle network may include a controller area network (CAN), a FlexRay-based network, a media oriented system transport (MOST)-based network, or the like. The multimedia system may include a navigation system, a telematics system, an infotainment system, or the like.

These systems and electronic devices constituting each system are connected through a vehicle network that supports functions of each of the electronic devices. A controller area network (CAN) may support a transmission rate up to 1 Mbps, automatic retransmission of collided frames, cycle redundancy check (CRC)-based error detection, and the like. The FlexRay-based network may support a transmission rate of up to 10 Mbps, simultaneous data transmission through two channels, synchronous data transmission, and the like. The MOST-based network is a communication network for high-quality multimedia and may support a transmission rate of up to 150 Mbps.

Generally, systems such as a telematics system, an infotainment system, and an enhanced safety system of a vehicle desire high transmission rate and system scalability, and the like. However, CAN and FlexRay-based networks do not sufficiently support high transmission rate and system scalability, and the like. The MOST-based network may support a higher transmission rate than CAN and FlexRay-based networks, but applying the MOST-based network to all networks in the vehicle is expensive in terms of cost. Due to these issues, an Ethernet-based network may be considered as a vehicle network. The Ethernet-based network may support bi-directional communication through a pair of wires and support a transmission rate of up to 10 Gbps.

Recently, a demand for over-the-air (OTA) update of an ECU provided in a vehicle has increased. Thus, various methods for updating each ECU connected to a vehicle network have been proposed.

In the conventional OTA update technology, update data (background) for each ECU is received from a data server, and whether to update each ECU is determined in consideration of a State of Charge (SOC) of a battery while the engine of the vehicle is stopped (ignition-off). Update data may be received through a bandwidth allocated to the vehicle because the vehicle includes a single transmit/receive antenna. The data server generally transmits update data to a plurality of vehicles. Thus, it typically takes a lot of time for the vehicles to receive the update data. In particular, when the vehicle is not allocated bandwidth from the data server, for example when the vehicle fails to access the data server, the vehicle typically waits until the vehicle is connected to a data server, thereby leading to delay in updating for each ECU.

The foregoing is intended to merely enhance an understanding of the background of the present disclosure, and is not intended to mean that the statements in this section fall within the preview of an existing technology well known to those of ordinary skill in the art to which this disclosure pertains.

SUMMARY

The present disclosure has been made to solve the above-mentioned problems occurring in the prior art while advantages achieved by the prior art are maintained intact.

An aspect of the present disclosure provides an automotive OTA update control device and a method therefor, which sequentially transmit received update data to a vehicle located nearby while receiving a plurality of pieces of update data for a first ECU from a data server and receive a plurality of pieces of update data for a second ECU from the vehicle located nearby to improve the update rate of each ECU.

Another aspect of the present disclosure provides device data server and a method therefor, which receive a request for cluster update from a first vehicle, transmit a plurality of pieces of update data for a first ECU to the first vehicle, and transmit a plurality of pieces of update data for a second ECU to a second vehicle located near the first vehicle, thus improving the update speed of each ECU for the first vehicle and the second vehicle.

Still another aspect of the present disclosure provides an automotive OTA update control system and a method therefor, in which a first vehicle requests cluster update from a data server and the data server transmits a plurality of pieces of update data for a first ECU to the first vehicle. The data server also transmits a plurality of pieces of update data for a second ECU to a second vehicle located near the first vehicle. The first vehicle sequentially transmits the received update data to the second vehicle while receiving a plurality of pieces of update data for the first ECU from the data server and sequentially receives a plurality of pieces of update data for the second ECU from the second vehicle, thus improving the update speed of each ECU for the first vehicle and the second vehicle.

The technical problems to be solved by the present disclosure are not limited to the aforementioned problems, and other technical problems not mentioned herein should be clearly understood from the following description by those having ordinary skill in the art to which the present disclosure pertains.

According to an aspect of the present disclosure, an automotive OTA update control device includes a first communication device that provides a communication interface with a data server and a second communication device that provides a communication interface between vehicles. The automotive OTA update control device includes a controller that requests cluster update from the data server, and allows the first communication device and the second communication device to transmit received update data to a vehicle located nearby while receiving a plurality of pieces of update data for a first ECU from the data server and to receive a plurality of pieces of update data for a second ECU from the vehicle located nearby.

According to an embodiment, the controller may sequentially transmit the received update data to the vehicle located nearby.

According to an embodiment, the controller may form a cluster with the vehicle located nearby before requesting cluster data from the data server.

According to an embodiment, the controller may request the cluster update from the data server based on identification information of the vehicle located nearby.

According to an embodiment, the controller may request a takeover service from the data server when communication is interrupted while receiving the plurality of pieces of update data for the second ECU from the vehicle located nearby.

According to an embodiment, the data server may transmit the plurality of pieces of update data for the second ECU to the vehicle located nearby in response to the cluster update being requested from the controller.

According to an embodiment, the vehicle located nearby may sequentially transmit the update data for the second ECU, the update data having been received from the data server, to the second communication device.

According to an embodiment, the vehicle located nearby may request a takeover service from the data server when communication is interrupted while receiving the update data for the first ECU from the second communication device.

According to another aspect of the present disclosure, an automotive OTA update control method includes requesting, by a controller, cluster update from a data server. The automotive OTA update control method also includes receiving, by the controller, a plurality of pieces of update data for a first ECU from the data server and transmitting, by the controller, the received update data to a vehicle located nearby. The automotive OTA update control method further includes receiving, by the controller, a plurality of pieces of update data for a second ECU from the vehicle located nearby.

According to an embodiment, transmitting the update to the vehicle located nearby may include sequentially transmitting, by the controller, the received update data to the vehicle located nearby.

According to an embodiment, the OTA update control method may further include forming, by the controller, a cluster with the vehicle located nearby before requesting cluster data from the data server.

According to an embodiment, requesting the cluster update from the data server may include transmitting, by the controller, identification information of the vehicle located nearby to the data server.

According to an embodiment, receiving the plurality pieces of update data for the second ECU includes requesting, by the controller, a takeover service from the data server when communication is interrupted while receiving the plurality of pieces of update data for the second ECU from the vehicle located nearby.

According to an embodiment, requesting the cluster update from the data server may include transmitting, by the data server, a plurality of pieces of update data for the second ECU to the vehicle located nearby in response to the cluster update based on the cluster update being requested from the controller by the data server.

According to an embodiment, requesting the cluster update from the data server may include sequentially transmitting, by the vehicle located nearby, the update data for the second ECU, the update data having been received from the data server, to a second communication device.

According to an embodiment, transmitting the received plurality pieces of update data to the vehicle located nearby includes requesting, by the vehicle located nearby, a takeover service from the data server when communication is interrupted while the vehicle located nearby is receiving update data for the first ECU from a second communication device.

BRIEF DESCRIPTION OF THE DRAWINGS

The above and other objects, features and advantages of the present disclosure should be more apparent from the following detailed description taken in conjunction with the accompanying drawings, in which.

DETAILED DESCRIPTION

Figure 1:
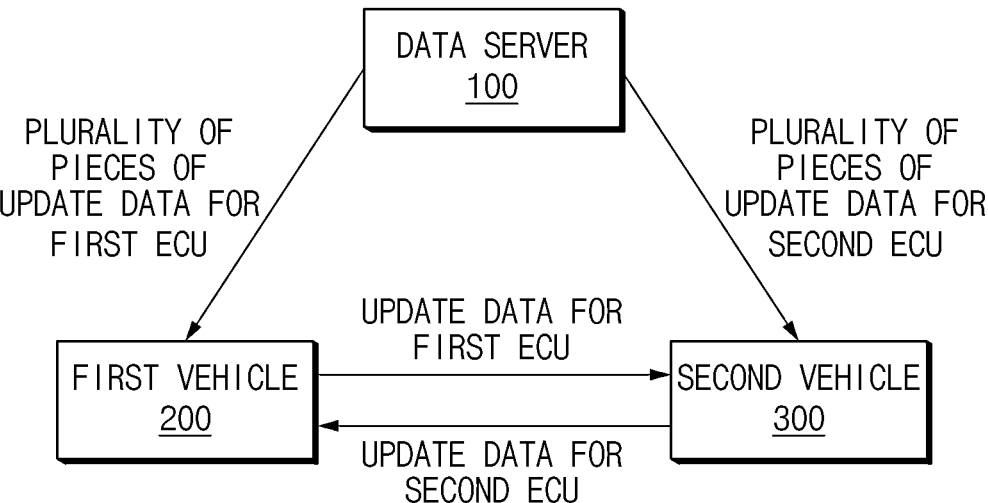
FIG. 1 is a configuration diagram of an automotive OTA update system, according to an embodiment of the present disclosure.

Hereinafter, embodiments of the present disclosure are described in detail with reference to the accompanying drawings. In the accompanying, drawing, it should be noted that the identical or equivalent components are designated by the identical reference numeral even when the components are illustrated in different drawings. Further, in describing the embodiment of the present disclosure, where it has been considered that a specific description of well-known features or functions may obscure the gist of the present disclosure, a detailed description thereof has been omitted.

In the following description of components of embodiments of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art, and should not be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to." meet that purpose or perform that operation or function.

FIG. 1 is a diagram illustrating an example configuration of an automotive OTA update system, according to an embodiment of the present disclosure.

Referring to FIG. 1, an automotive OTA update system according to an embodiment of the present disclosure may include a data server 100, a first vehicle 200, and a second vehicle 300. Although the first vehicle 200 and the second vehicle 300 are described as examples in embodiments of the present disclosure, the number of vehicles does not affect the present disclosure and the automotive OTA update system may include other numbers of vehicles in other embodiments.

The data server 100 may manage update data for ECUs provided in the first vehicle 200 and the second vehicle 300 in the form of a database (DB). The data server 100 may communicate with the first vehicle 200 and the second vehicle 300 through a wireless communication network.

The data server 100 may receive a request for cluster update from the first vehicle 200, transmit a plurality of pieces of update data for a first ECU to the first vehicle 200, and transmit a plurality of pieces of update data for a second ECU to the second vehicle 300 located nearby of the first vehicle 200.

When communication between the first vehicle 200 and the second vehicle 300 is interrupted while the first vehicle 200 receives update data for the second ECU from the second vehicle 300, the data server 100 may provide a takeover service for update data of the second ECU to the first vehicle 200 as the data server 100 receives a request for the takeover service from the first vehicle 200. In an embodiment, the first vehicle 200 may communicate with the data server 100 and the second vehicle 300 based on the multiple input multiple output (MIMO) antenna technology, for example.

When communication between the first vehicle 200 and the second vehicle 300 is interrupted while the second vehicle 300 receives update data for the first ECU from the first vehicle 200, the data server 100 may provide a takeover service for update data of the first ECU to the second vehicle 300 as the data server 100 receives a request for the takeover service from the second vehicle 300. In an embodiment, the second vehicle 300 may communicate with the data server 100 and the first vehicle 200 based on the MIMO antenna technology, for example.

When update data for a certain ECU is greater than a predetermined size, the data server 100 may divide the update data into a plurality of pieces of update data. The data server 100 may sequentially transmit the plurality of pieces of update data resulted from division to the first vehicle 200 and the second vehicle 300.

The first vehicle 200 may include an OTA update control device 400 according to an embodiment of the present disclosure. The first vehicle 200 may request cluster update from the data server 100, sequentially transmit received update data to the second vehicle 300 while receiving a plurality of pieces of update data for the first ECU from the data server 100, and sequentially receive a plurality of pieces of update data for the second ECU from the second vehicle 300.

When communication with the second vehicle 300 is interrupted, for example, when the second vehicle 300 is out of a communication range with the first vehicle 200, the first vehicle 200 may receive a takeover service by requesting the takeover service from the data server 100. The takeover service may be a service in which the first vehicle 200 transmits information on update data which has been currently received to the data server 100, and receives unreceived update data from the data server 100.

Similarly, the second vehicle 300 may include the OTA update control device 400 according to an embodiment of the present disclosure. The second vehicle 300 may transmit received update data to the first vehicle 200 while receiving a plurality of pieces of update data for the second ECU from the data server 100 and also, sequentially receive a plurality of pieces of update data for the first ECU from the first vehicle 200.

When communication with the first vehicle 200 is interrupted, for example, when the first vehicle 200 is out of a communication range with the second vehicle 300, the second vehicle 300 may receive a takeover service by requesting the takeover service from the data server 100.

Figure 2:
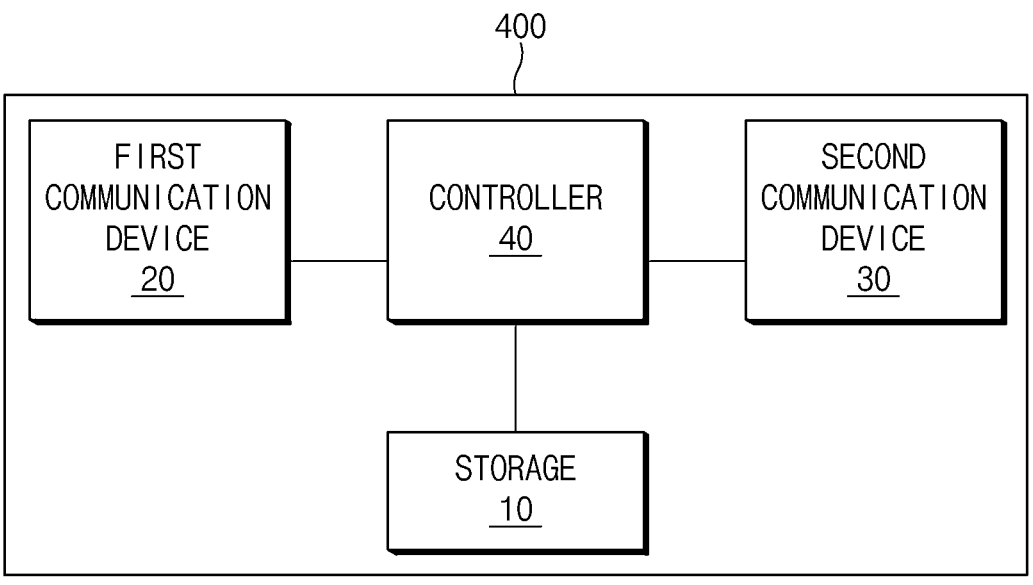
FIG. 2 is a configuration diagram of an automotive OTA update control device, according to an embodiment of the present disclosure.

FIG. 2 is a diagram of an example configuration of an automotive OTA update control device, according to an embodiment of the present disclosure.

Referring to FIG. 2, the automotive OTA update control device 400 according to an embodiment of the present disclosure may include a storage device 10, a first communication device 20, a second communication device 30, and a controller 40. According to some embodiments of the present disclosure, the components may be combined with each other as one entity, or some components may be omitted. The automotive OTA update control device 400 according to an embodiment of the present disclosure may be provided in the first vehicle 200 and the second vehicle 300. As noted above, although the first vehicle 200 and the second vehicle 300 are described as examples in the embodiment of the present disclosure, the number of vehicles does not affect the present disclosure.

The storage device 10 may store various logics, algorithms, and programs for implementing the process of sequentially transmitting received update data to a vehicle located nearby while receiving a plurality of pieces of update data for the first ECU from the data server 100 and receive a plurality of pieces of update data for the second ECU from the vehicle.

The storage device 10 may store various logics, algorithms, and programs for implementing a process in which the first vehicle 200 requests cluster update from the data server 100, sequentially transmits received update data to the second vehicle 300 while receiving a plurality of pieces of update data for the first ECU from the data server 100, and sequentially receives a plurality of pieces of update data for the second ECU from the second vehicle 300.

The storage device 10 may store various logics, algorithms, and programs for implementing a process in which the second vehicle 300 sequentially transmits received update data to the first vehicle 200 and sequentially receives plurality of pieces of update data for the first ECU from the first vehicle 200, while receiving a plurality of pieces of update data for the second ECU from the data server 100.

The storage device 10 may include at least one type of storage medium of memories such as a flash memory type memory, a hard disk type memory, a micro type memory, and a card type memory (e.g., an SD card (Secure Digital Card) or an XD card (eXtream Digital Card)), a RAM (Random Access Memory), an SRAM (Static RAM), a ROM (Read Only Memory), a PROM (Programmable ROM), a EEPROM (Electrically Erasable PROM), a MRAM (Magnetic RAM), and an optical disk type memory.

The first communication device 20 may be a module or device that provides a communication interface with the data server 100, and may download update data (e.g., firmware) to be applied to each ECU from the data server 100.

The first communication device 20 may include at least one or more of a mobile communication module, a wireless Internet module, a short-range communication module, or a combination thereof.

The mobile communication module may receive update data through a mobile communication network established according to a technical standard or a communication scheme for mobile communication (e.g., Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), or LTE-A (Long Term Evolution-Advanced), or the like.

The wireless Internet module may be a module or device for access to wireless Internet and may receive update data through Wireless LAN (WLAN), Wireless-Fidelity (Wi-Fi), Wi-Fi Direct, Digital Living Network Alliance (DLNA), Wireless Broadband (WiBro), WiMAX (World Interoperability for Microwave Access), High Speed Downlink Packet Access (HSDPA), High Speed Uplink Packet Access (HSUPA), Long Term Evolution (LTE), Long Term Evolution-Advanced (LTE-A), or the like.

The short-range communication module may support short-range communication using at least one of Bluetooth™, Radio Frequency Identification (RFID), Infrared Data Association (IrDA), Ultra Wideband (UWB), ZigBee, Near Field Communication (NFC), Wireless USB (Wireless Universal Serial Bus) technologies, or a combination thereof.

The second communication device 30 may be a module or device that provides a vehicle to vehicle communication interface. The second communication device 30 may transmit and receive update data.

The second communication device 30 may include at least one transceiver comprised of one transmitter (Tx) and one receiver (Rx). The second communication device 30 may receive second update data through the receiver while transmitting first update data through the transmitter. In an embodiment, the first communication device 20 and the second communication device 30 may be implemented as one DCU (Data Communication Unit), for example, and may interwork with each other based on the MIMO antenna technology.

The controller 40 may perform overall control such that each of the above components performs its function. The controller 40 may be implemented in the form of hardware or software, or may be implemented in a combination of hardware and software. The controller 40 may be implemented with a microprocessor, but is not limited thereto.

The controller 40 may perform a variety of control operations in the process of requesting cluster update from the data server 100, sequentially transmitting received update data to a vehicle located nearby while receiving a plurality of pieces of update data for the first ECU from the data server 100, and receiving a plurality of pieces of update data for the second ECU from the vehicle.

In addition, when communication with the second vehicle 300 is interrupted in the process of receiving update data for the second ECU from the second vehicle 300, the controller

40 may request a takeover service for update data for the second ECU and receive unreceived update data for the second ECU.

When communication with the first vehicle 200 is interrupted in the process of receiving update data for the first ECU from the first vehicle 200, the controller 40 may request a takeover service for update data for the first ECU and receive unreceived update data for the first ECU.

In an embodiment, the controller 40 may be implemented as, for example, a Central Communication Unit (CCU).

Hereinafter, operation of the controller 40 according to an embodiment of the present disclosure is described below with reference to FIG. 3.

Figure 3:
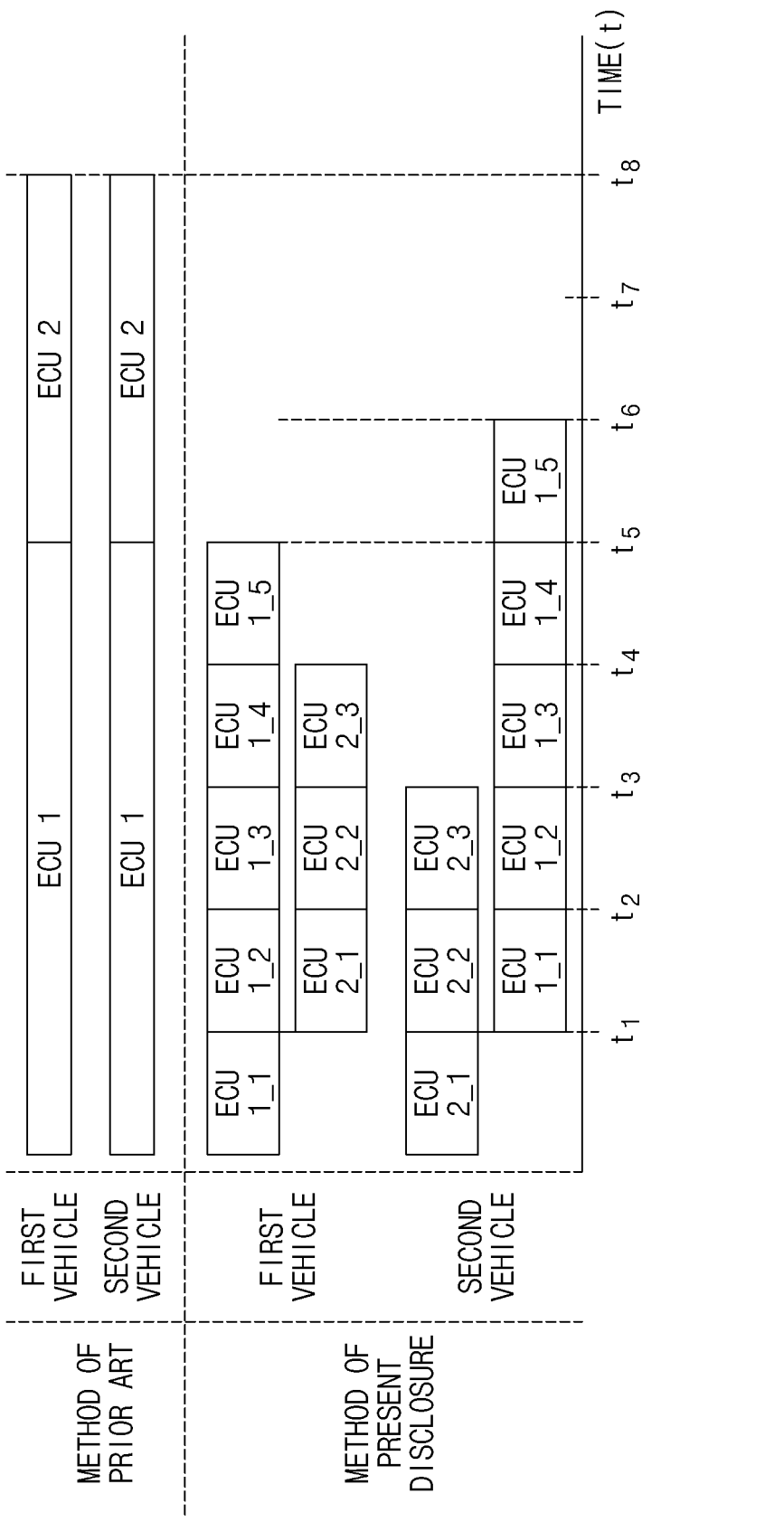
FIG. 3 is an view illustrating operation of a controller included in an automotive OTA update control device, according to an embodiment of the present disclosure.

FIG. 3 is a view illustrating operation of a controller (e.g., the controller 40) included in an automotive OTA update control device, according to an embodiment of the present disclosure.

The controller 40 may request cluster update from the data server 100. The data server 100 that has received the request may transmit a plurality of pieces of update data for a first ECU (e.g., ECU 1_1, ECU 1_2, ECU 1_3, ECU 1_4 and ECU 1_5) to the first vehicle 200 and transmit a plurality of pieces of update data for a second ECU (e.g., ECU 2_1, ECU 2_2, and ECU 2_3) to the second vehicle 300.

Referring to FIG. 3, the first communication device 20 provided in the first vehicle 200 may have received ECU 1_1 at time point $t_1$, have received ECU 1_2 at time point $t_2$, have received ECU 1_3 at time point $t_3$, have received ECU 1_4 at time point $t_4$, and have received ECU 1_5 at time point $t_5$. As a result, the first vehicle 200 may have received all of a plurality of pieces of update data for the first ECU at time point $t_5$.

In the process of receiving the plurality of pieces of update data for the first ECU, a transmitter in the second communication device 30 of the first vehicle 200 may transmit ECU 1_1 to the second vehicle 300 at time point $t_1$, and a receiver in the second communication device 30 of the first vehicle 200 may receive ECU 2_1 from the second vehicle 300 at time point $t_1$.

The transmitter in the second communication device 30 of the first vehicle 200 may transmit ECU 1_2 to the second vehicle 300 at time point $t_2$, and a receiver in the second communication device 30 of the first vehicle 200 may receive ECU 2_2 from the second vehicle 300 at time point $t_2$.

The transmitter in the second communication device 30 of the first vehicle 200 may transmit ECU 1_3 to the second vehicle 300 at time point $t_3$, and the receiver in the second communication device 30 of the first vehicle 200 may receive ECU 2_3 from the second vehicle 300 at time point $t_3$.

The transmitter in the second communication device 30 of the first vehicle 200 may transmit ECU 1_4 to the second vehicle 300 at time point $t_4$, and the receiver in the second communication device 30 of the first vehicle 200 may have received ECU 2_3 from the second vehicle 300 at time point $t_4$.

The transmitter in the second communication device 30 of the first vehicle 200 may transmit ECU 1_5 to the second vehicle 300 at time point $t_5$. The receiver in the second communication device 30 of the second vehicle 300 may have received ECU 1_5 at time point $t_6$.

As a result, a time point at which the first vehicle 200 has received a plurality of pieces of update data for the first ECU from the data server 100 may be $t_5$, a time point at which the first vehicle 200 has received a plurality of pieces of update data for the second ECU from the second vehicle 300 may be $t_4$, a time point at which the second vehicle 300 has received a plurality of pieces of update data for the second ECU from the data server 100 may be $t_3$, and a time point at which the second vehicle 300 has received a plurality of pieces of update data for the first ECU from the first vehicle 200 may be $t_6$. The time points when reception of the update data in both the first vehicle 200 and the second vehicle 300 is completed may be $t_6$.

On the other hand, according to a conventional method, the data server 100 may sequentially transmit update data ECU 1 for the first ECU and update data ECU 2 for the second ECU to the first vehicle 200 and also sequentially transmit update data ECU 1 for the first ECU and update data ECU 2 for the second ECU to the second vehicle 300. Therefore, according to the conventional method, the time points when reception of the update data in both the first vehicle 200 and the second vehicle 300 is completed may be $t_8$.

Accordingly, in embodiments of the present disclosure, update data may be transmitted more quickly as compared to the conventional method.

Figure 4:
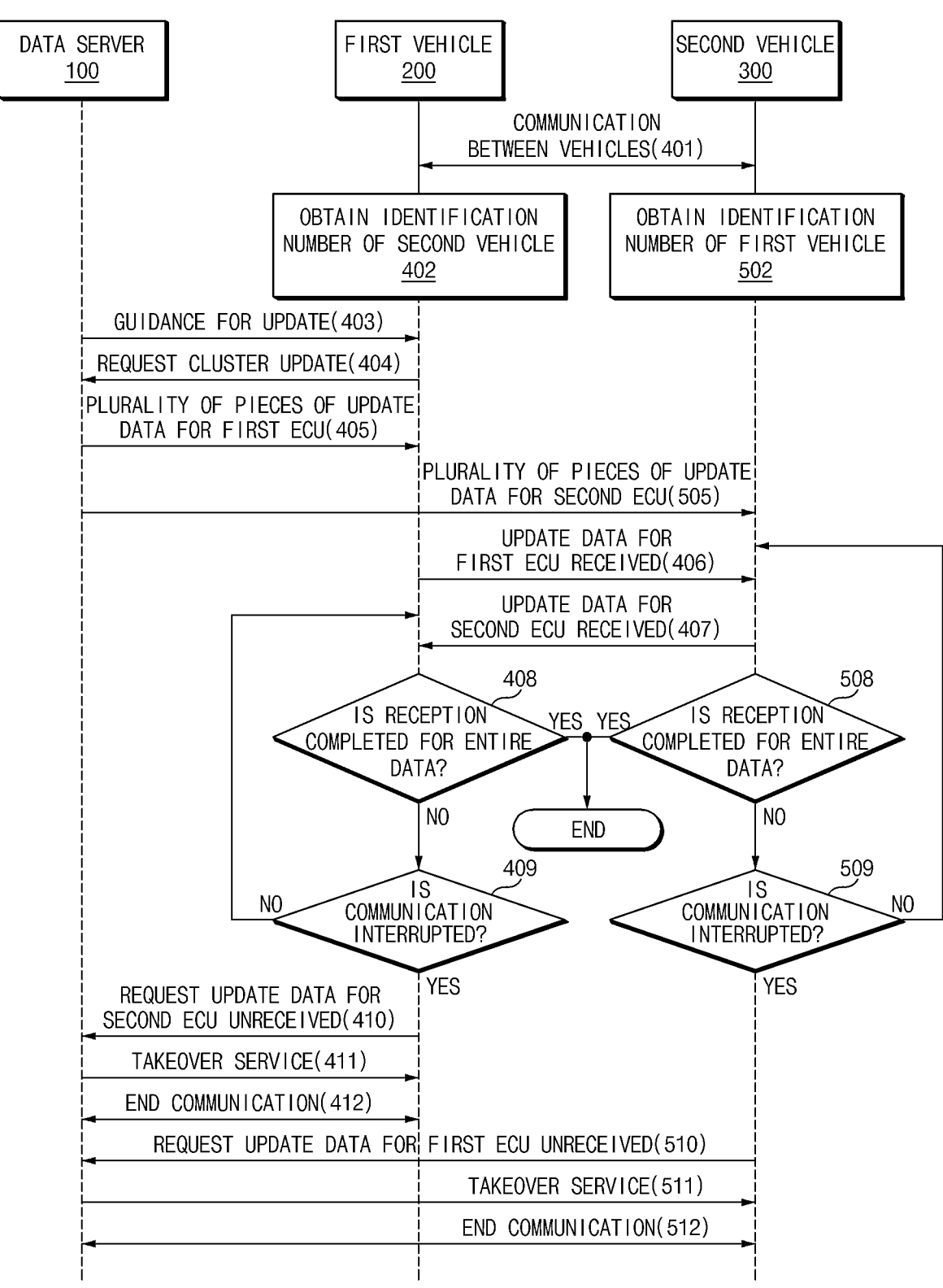
FIG. 4 is a flowchart of an automotive OTA update control method, according to an embodiment of the present disclosure.

FIG. 4 is a flowchart of an automotive OTA update control method, according to an embodiment of the present disclosure. In an embodiment, the operations describes below as being performed by the first vehicle 200 may be performed by the controller 40.

In an operation 401, the first vehicle 200 may form a cluster by performing communication (e.g., V2V communication) with the second vehicle 300 located at a short distance (e.g., 100 m). In an operation 502, the first vehicle 200 may obtain identification information of the second vehicle 300 (402), and the second vehicle 300 may obtain identification information of the first vehicle 200.

The first vehicle 200 may receive guidance for update of each ECU from the data server 100 (403).

Thereafter, the first vehicle 200 may request cluster update from the data server 100 (404). In an embodiment, when the second vehicle 300 receives the guidance for update of each ECU from the data server 100, the second vehicle 300 may request cluster update from the data server 100.

Thereafter, the first vehicle 200 may receive a plurality of update data for the first ECU from the data server 100 (405). The second vehicle 300 may receive a plurality of update data for the second ECU from the data server 100 (505).

Thereafter, the first vehicle 200 may transmit received update data for the first ECU to the second vehicle 300 (406), and also may receive update data for the second ECU from the second vehicle 300 (407). In an embodiment, the second vehicle 300 may transmit the received update data for the second ECU to the first vehicle 200.

When the transmission of update data for the first ECU to the second vehicle 300 is completed and reception of the update data for the second ECU from the second vehicle 300 is completed (YES in an operation 408), the first vehicle 200 may end communication with the second vehicle 300. When the transmission of update data for the second ECU to the first vehicle 200 is completed and reception of the update data for the first ECU from the first vehicle 200 is completed (YES in an operation 508), the second vehicle 300 may end communication with the first vehicle 200.

When communication with the second vehicle 300 is interrupted (YES in operation 409), for example when the second vehicle 300 is out of a communication range with the first vehicle 200, the first vehicle 200 may request the takeover service from the data server 100 (410). When communication with the first vehicle 200 is interrupted (YES in an operation 509), the second vehicle 300 may request the takeover service from the data server 100 (510).

In addition, the first vehicle 200 may receive the takeover service from the data server 100 (411). The second vehicle 300 may receive the takeover service from the data server 100 (511).

Thereafter, the first vehicle 200 may end communication with the second vehicle 300 when the takeover service is completed (412). In this case, the second vehicle 300 may end communication with the first vehicle 200 when the takeover service is completed (512).

Figure 5:
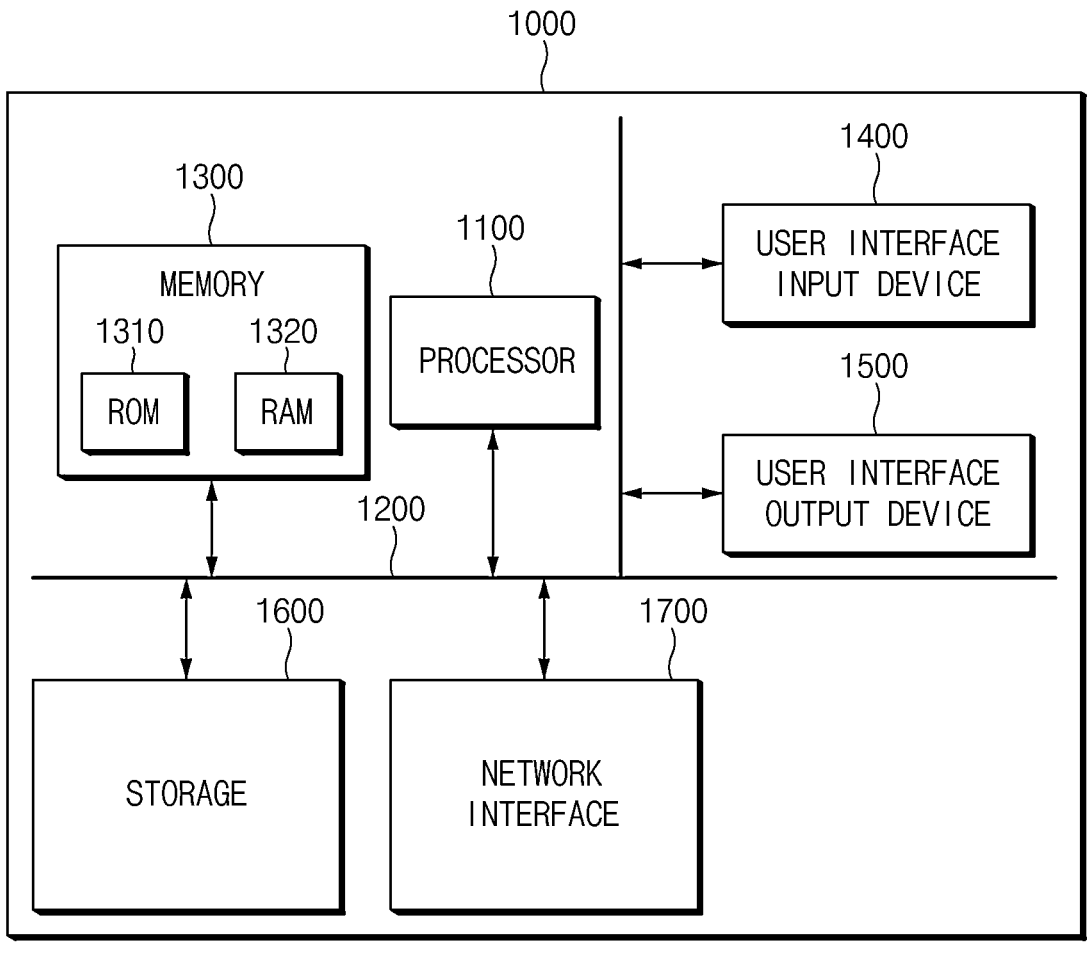
FIG. 5 is a block diagram showing a computing system for executing an automotive OTA update control method, according to an embodiment of the present disclosure.

FIG. 5 is a block diagram showing a computing system for executing an automotive OTA update control method, according to an embodiment of the present disclosure.

Referring to FIG. 5, an automotive OTA update control method according to an embodiment of the present disclosure as described above may be implemented through a computing system 1000. The computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another embodiment, the processor 1100 and the storage medium may reside in the user terminal as separate components.

The above description is merely illustrative of the technical idea of the present disclosure, and various modifications and variations may be made without departing from the essential characteristics of the present disclosure by those having ordinary skill in the art to which the present disclosure pertains. Accordingly, embodiments of the present disclosure are not intended to limit the technical idea of the present disclosure, but to explain the spirit and scope of the present disclosure. The scope of the technical idea of the present disclosure is not limited by the embodiments. The scope of protection of the present disclosure should be interpreted by the following claims, and all technical ideas within the scope equivalent thereto should be construed as being included in the scope of the present disclosure.

According to the automotive OTA update control device and a method therefor, it is possible to sequentially transmit received update data to a vehicle located nearby while receiving a plurality of pieces of update data for a first ECU from a data server, and receive a plurality of pieces of update data for a second ECU from the vehicle located nearby to improve the update rate of each ECU.

Although the present disclosure has been described with reference to examples embodiments and the accompanying drawings, the present disclosure is not limited thereto, but may be variously modified and altered by those having ordinary skill in the art to which the present disclosure pertains without departing from the spirit and scope of the present disclosure.

What is claimed is:

1. An automotive over-the-air (OTA) update control device, comprising:
a first communication device configured to provide a communication interface with a data server;
a second communication device configured to provide a communication interface between vehicles; and
a controller configured to request cluster update from the data server, and allow the first communication device and the second communication device to transmit received update data to a vehicle located nearby while receiving a plurality of pieces of update data for a first Electronic Control Unit (ECU) from the data server and to receive a plurality of pieces of update data for a second ECU from the vehicle located nearby, wherein the controller is configured to sequentially transmit the received update data to the vehicle located nearby.

2. The automotive OTA update control device of claim 1, wherein the controller is configured to form a cluster with the vehicle located nearby before requesting cluster data from the data server.

3. The automotive OTA update control device of claim 1, wherein the controller is configured to request the cluster update from the data server based on identification information of the vehicle located nearby.

4. The automotive OTA update control device of claim 1, wherein the controller is configured to request a takeover service from the data server when communication is interrupted while receiving the plurality of pieces of update data for the second ECU from the vehicle located nearby.

5. The automotive OTA update control device of claim 1, wherein the data server is configured to transmit the plurality of pieces of update data for the second ECU to the vehicle located nearby in response to the cluster update being requested from the controller.

6. The automotive OTA update control device of claim 5, wherein the vehicle located nearby is configured to sequentially transmit the update data for the second ECU, the update data having been received from the data server, to the second communication device.

7. The automotive OTA update control device of claim 1, wherein the vehicle located nearby is configured to request a takeover service from the data server when communication is interrupted while receiving the update data for the first ECU from the second communication device.

8. An automotive over-the-air (OTA) update control method, the method comprising:
requesting, by a controller via a first communication device, cluster update from a data server;
transmitting, by the controller via a second communication device, received update data to a vehicle located nearby while receiving, by the controller via the first communication device, a plurality of pieces of update data for a first Electronic Control Unit (ECU) from the data server; and
receiving, by the controller via the second communication device, a plurality of pieces of update data for a second ECU from the vehicle located nearby,
wherein the method includes sequentially transmitting, by the controller via the second communication device, the received update data to the vehicle located nearby.

9. The automotive OTA update control method of claim 8, further comprising:
forming, by the controller, a cluster with the vehicle located nearby before requesting cluster data from the data server.

10. The automotive OTA update control method of claim 8, wherein requesting the cluster update from the data server includes transmitting, by the controller, identification information of the vehicle located nearby to the data server.

11. The automotive OTA update control method of claim 8, wherein receiving the plurality pieces of update data for the second ECU includes requesting, by the controller, a takeover service from the data server when communication is interrupted while receiving the plurality of pieces of update data for the second ECU from the vehicle located nearby.

12. The automotive OTA update control method of claim 8, wherein requesting the cluster update from the data server includes transmitting, by the data server, a plurality of pieces of update data for the second ECU to the vehicle located nearby in response to the cluster update based on the cluster update being requested from the controller by the data server.

13. The automotive OTA update control method of claim 12, wherein requesting the cluster update from the data server includes sequentially transmitting, by the vehicle located nearby, the update data for the second ECU, the update data having been received from the data server, to a second communication device.

14. The automotive OTA update control method of claim 8, wherein transmitting the received plurality pieces of update data to the vehicle located nearby includes requesting, by the vehicle located nearby, a takeover service from the data server when communication is interrupted while the vehicle located nearby is receiving update data for the first ECU from a second communication device.

* * * * *